United States Patent
Lv et al.

(10) Patent No.: US 12,214,791 B2
(45) Date of Patent: Feb. 4, 2025

(54) METHOD FOR MONITORING VEHICLE OVERLOAD BASED ON GRAVITY ANOMALY

(71) Applicant: ZHEJIANG UNIVERSITY, Zhejiang (CN)

(72) Inventors: Chaofeng Lv, Hangzhou (CN); Yinnan Zhang, Hangzhou (CN); He Zhang, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 287 days.

(21) Appl. No.: 17/826,148

(22) Filed: May 26, 2022

(65) Prior Publication Data

US 2022/0281463 A1    Sep. 8, 2022

Related U.S. Application Data

(63) Continuation of application No. PCT/CN2020/136156, filed on Dec. 14, 2020.

(30) Foreign Application Priority Data

Dec. 30, 2019    (CN) .......................... 201911400444.3

(51) Int. Cl.
*B60W 40/13*    (2012.01)
*B60W 40/06*    (2012.01)

(52) U.S. Cl.
CPC ............ *B60W 40/13* (2013.01); *B60W 40/06* (2013.01); *B60W 2040/1315* (2013.01)

(58) Field of Classification Search
CPC ................. B60W 40/13; B60W 40/06; B60W 2040/1315

(Continued)

(56) References Cited

U.S. PATENT DOCUMENTS

| | | | |
|---|---|---|---|
| 11,199,469 B2* | 12/2021 | Kusaka | G01G 19/022 |
| 2011/0267200 A1* | 11/2011 | Reynolds | G01G 19/024 |
| | | | 177/1 |

(Continued)

FOREIGN PATENT DOCUMENTS

| | | |
|---|---|---|
| CN | 205428206 U | 8/2016 |
| CN | 206208369 U | 5/2017 |

(Continued)

OTHER PUBLICATIONS

Identification of moving loads based on the information fusion_May 2018 Dan et al. (Year: 2018).*

(Continued)

*Primary Examiner* — Yazan A Soofi
*Assistant Examiner* — Ahmed Alkirsh
(74) *Attorney, Agent, or Firm* — W&G Law Group

(57) ABSTRACT

Disclosed is a method for monitoring vehicle overload based on gravity anomaly, which includes the following steps of: setting a plurality of measuring positions on a single lane, arranging a gravimeter to acquire gravity anomaly values caused by a vehicle when the middle position along the length direction of the vehicle reaching each measuring position, using a monitoring camera to judge the category of the vehicle, acquire three geometric dimensions of the vehicle, and determine the position of the vehicle. The vehicle is simplified as a cuboid, and the mass density distribution is simplified as a piecewise constant function along the length direction of the vehicle. Calculating values of the piecewise constant function according to the gravity anomaly values, calculating a total weight of the vehicle according to the mass density distribution, comparing the total weight with the weight limit of the vehicle to judge whether the vehicle is overloaded.

4 Claims, 2 Drawing Sheets

(58) Field of Classification Search
USPC .......................................................... 701/124
See application file for complete search history.

(56) References Cited

U.S. PATENT DOCUMENTS

| | | | | | |
|---|---|---|---|---|---|
| 2012/0259536 | A1* | 10/2012 | Klier | ..................... | B60W 40/12 701/124 |
| 2013/0138288 | A1* | 5/2013 | Nickolaou | ............ | B60W 40/13 701/99 |
| 2014/0309844 | A1* | 10/2014 | Breed | ................... | G01G 19/024 702/175 |
| 2018/0170396 | A1* | 6/2018 | Burnette | ............. | B60W 10/184 |
| 2022/0176959 | A1* | 6/2022 | Katsuki | ..................... | G01G 9/00 |
| 2023/0286493 | A1* | 9/2023 | Tomatsu | ............ | G01C 21/3461 |

FOREIGN PATENT DOCUMENTS

| | | | |
|---|---|---|---|
| CN | 107499232 | A | 12/2017 |
| CN | 109471190 | A | 3/2019 |
| CN | 208672814 | U | 3/2019 |
| CN | 110232824 | A | 9/2019 |
| CN | 111189519 | A | 5/2020 |
| EP | 0108896 | A2 | 5/1984 |
| EP | 0108896 | B1 | 1/1988 |
| JP | 3467906 | B2 | 11/2003 |
| JP | 4979306 | B2 | 7/2012 |

OTHER PUBLICATIONS

Probabilistic Bridge Weigh-in-Motion Nov. 24, 2017 OBrien et al. (Year: 2017).*
2017—Van Camp—Geophysics From Terrestrial Time-Variable Gravity Measurements (Year: 2017).*
Dentification of moving loads based on the information fusion_May 2018 Dan et al. (Year: 2018).*
International Search Report (PCT/CN2020/136156); Date of Mailing: Mar. 2, 2021.
CN First Office Action(201911400444.3); Date of Mailing: Sep. 8, 2020.
CN Notice Of Allowance(201911400444.3); Date of Mailing: Sep. 22, 2020.
Notice Of Allowance(2021-538189); Date of Mailing: May 16, 2022.
The study on rapid interpretation techniques of gravity anomaly and gravity gradient tensor data; Date of Mailing: Oct. 15, 2014.
Weighted cross-gradient function for joint inversion with the application to regional 3-D gravity and magnetic anomalies; Date of Mailing: Jun. 30, 2019.
Introduction to geophysics(machine translation); Date of Mailing: Jan. 31, 2017.

* cited by examiner

SIDE VIEW FRONT VIEW

METHOD FOR MONITORING VEHICLE OVERLOAD BASED ON GRAVITY ANOMALY

CROSS-REFERENCE TO RELATED APPLICATIONS

The present application is a continuation of International Application No. PCT/CN2020/136156, filed on Dec. 14, 2020, which claims priority to Chinese Application No. 201911400444.3, filed on Dec. 30, 2019, the contents of both of which are incorporated herein by reference in their entireties

TECHNICAL FIELD

The present disclosure relates to the field of vehicle overload monitoring, in particular to a method for monitoring vehicle overload based on gravity anomaly.

BACKGROUND

China is in the period of rapid development of infrastructure construction, and the road traffic facilities are becoming more and more mature. However, due to factors such as driver's level and quality, road safety factor, and load limitation of special structures such as bridges, road traffic safety problems are still severe. Among them, the problem of traffic overload is particularly serious. Overload monitoring is still in a low-density "spot check" state, and the main monitoring methods can be divided into dynamic weighing and static weighing according to whether it is necessary for the vehicle to stop to be weighed.

It needs to implant the equipment into road pavement for the dynamic weighing, which is not suitable for bridge structures with a thin pavement layer. At the same time, the interface between implanted monitoring equipment and the road pavement layer tends to cause uneven deformation due to the difference of material stiffness, which not only affects the smoothness of the road surface, but also makes monitoring equipment more easily damaged and reduces the service life of the monitoring equipment. In addition, dynamic weighing depends on the interaction between vehicles and monitoring equipment. Therefore, the weighing results are easily affected by the smoothness of the road surface and the driving state of vehicles. The impact load caused by the unevenness of the road surface and the acceleration and deceleration process of vehicles will all cause the uncertainty of the weighing results.

Static weighing used in toll stations is only suitable for expressways with entrances and exits because of the need for parking weighing. Parking weighing will seriously affect the normal operation of traffic in urban sections with a dense traffic flow.

SUMMARY

In order to overcome the shortcomings of the prior art, the present disclosure provides a method for monitoring the total weight of the vehicle based on gravity anomaly, which calculates the mass of the vehicle and judges whether the vehicle is overloaded by measuring the gravity difference caused by the vehicle that is passing by. The specific technical solution is as follows.

A method for monitoring vehicle overload based on gravity anomaly includes the following steps:

S1, setting a plurality of measuring positions on a single lane;

S2, using a monitoring camera to determine a position of a vehicle, obtain three geometric dimensions of length, width and height of the vehicle, and determine a weight limit of the vehicle by judging the category of the vehicle, wherein the three geometric dimensions of length, width and height are maximum values of the vehicle in length, width and height directions respectively;

S3, using a gravimeter to obtain a gravity anomaly value caused by the vehicle when a middle position in the length direction of the vehicle reaching each measuring position;

S4, simplifying the vehicle into a cuboid, wherein the length, width and height of the cuboid correspond to the three geometric dimensions of the vehicle respectively; simplifying a mass density distribution into a piecewise constant function along the length direction of the vehicle, and calculating values of the piecewise constant function according to the gravity anomaly value caused by the vehicle at each measuring position.

S5, calculating a total weight of the vehicle according to the mass density distribution, and comparing the total weight of the vehicle with the weight limit of the vehicle to judge whether the vehicle is overloaded.

Furthermore, the number of the measuring positions and the distances between the measuring positions can be determined according to requirements of road section speed limit and measuring accuracy, but the number of the measuring positions should not be less than one.

Furthermore, the gravimeter is arranged right above the intersection of the center line of the single lane and the equidistance line of the first measuring position and the last measuring position, and when there is only one measuring position, the gravimeter is arranged right above the intersection of the center line of the single lane and the measuring position, and the arrangement height should be greater than the road height limit.

Furthermore, the number of values of the mass density piecewise constant function is the same as or less than the number of the measuring positions.

Furthermore, in S4, values of the piecewise constant function according to the gravity anomaly value caused by the vehicle at each measuring position are calculated as below:

(1) when distances between the measuring positions are identical, a mass density piecewise constant function p of the vehicle is expressed as follows:

$$\rho = \rho_j, x \in \left[\left|i - \frac{(n+1)}{2}\right|L - \frac{a}{2} + \frac{j-1}{m}a, \left|i - \frac{(n+1)}{2}\right|L - \frac{a}{2} + \frac{j}{m}a\right),$$

$$j = 1, 2, 3, \ldots, m, i = 1, 2, 3, \ldots, n, m \le n,$$

where x is a horizontal coordinate of a certain point inside the vehicle, n is a number of the measuring positions, m is a number of values of the mass density piecewise constant function, L is the distance between the measuring positions and a is the length of the vehicle;

the gravity anomaly value measured at the $i^{th}$ measuring position is expressed as:

$$\Delta g_i = G \int_{|i-(n+1)/2|L-a/2}^{|i-(n+1)/2|L+a/2} \int_{-b/2}^{b/2} \int_0^c \rho \frac{z-H}{R^3} dz dy dx,$$

wherein $$R = [x^2 + y^2 + (z-H)^2]^{0.5},$$

where G is the gravitation constant, b is the width of the vehicle, c is the height of the vehicle, y is a transverse coordinate of the point inside the vehicle, z is a vertical coordinate of the point inside the vehicle and H is a vertical height of the gravimeter from the ground;

n gravity anomaly values are obtained from n measuring positions, and n linear equations which $p_j$ satisfy are formed:

$$\Delta g_i = -G \sum_{j=1}^{m} p_j \left\{ x \ln(y+R) + y \ln(x+R) - (z-H) \arctan \frac{xy}{(z-H)R} \right\} \bigg|_{x_1}^{x_2} \bigg|_{y_1}^{y_2} \bigg|_{z_1}^{z_2},$$

where $$x_1 = \left| i - \frac{(n+1)}{2} \right| L - \frac{a}{2} + \frac{j-1}{m} a, \quad x_2 = \left| i - \frac{(n+1)}{2} \right| L - \frac{a}{2} + \frac{j}{m} a,$$

$$y_1 = -b/2, \quad y_2 = b/2, \quad z_1 = 0, \quad z_2 = c$$

the values of $p_j$ are solved according to the above n linear equations, then the mass density piecewise constant function p is determined according to $p_j$;

(2) when the distances between the measuring positions are different, the calculation process of the mass density piecewise constant function p of the vehicle is similar to that when the distances between the measuring positions are identical, except that $$\left| i - \frac{(n+1)}{2} \right| L$$

in the above calculation formulas is replaced by $$\left| \sum_{k=1}^{i-1} L_k - \frac{1}{2} L_{total\ length} \right|,$$

wherein $$L_{total\ length} = \sum_{k=1}^{n-1} L_k$$

$L_k$, k=1, 2, . . . n−1, is the distance between a $k^{th}$ measuring position and a $(k+1)^{th}$ measuring position; and Furthermore, a calculation method of calculating the total weight of the vehicle according to the mass density distribution in S5 is as follows:

$$m_{total\ weight} = \sum_{i=1}^{m} \rho_i \frac{a}{m} bc$$

where $m_{total\ weight}$ is the total weight of the vehicle.

The present disclosure has the beneficial effects that the load condition of the vehicle is judged by utilizing the gravity anomaly value generated in the space when the vehicle passes by, and the defect that the weighing result of the traditional dynamic weighing is uncertain due to the influence of road conditions and the driving state of the vehicle is effectively eliminated in a non-contact monitoring mode, and the defect that the traditional static weighing needs the vehicle to stop to be weighed, thus affecting the traffic is eliminated. The data acquisition equipment, the monitoring camera and the gravimeter required for the realization of the present disclosure can be arranged on the upper part of the road to monitor the vehicle load condition in real time without affecting the normal operation of road traffic. Meanwhile, the accuracy of the weighing result obtained by the method increases with the increase of the number of the measuring positions, and the number of the measuring positions can be determined according to the actual needs of each road section.

BRIEF DESCRIPTION OF DRAWINGS

The present disclosure will be further explained with reference to drawings and examples.

Reference signs: 1. The first measuring position, 2. The last measuring position, 3. Lane line, 4. Gravimeter, 5. Monitoring camera, 6. Vehicle, 7. Simplified cuboid.

DESCRIPTION OF EMBODIMENTS

The purpose and effect of the present disclosure will become clearer by describing the present disclosure in detail according to the drawings and preferred embodiments. It should be understood that the specific embodiments described here are only used to explain the present disclosure, and are not used to limit the present disclosure.

[Example 1]

Figure 1:
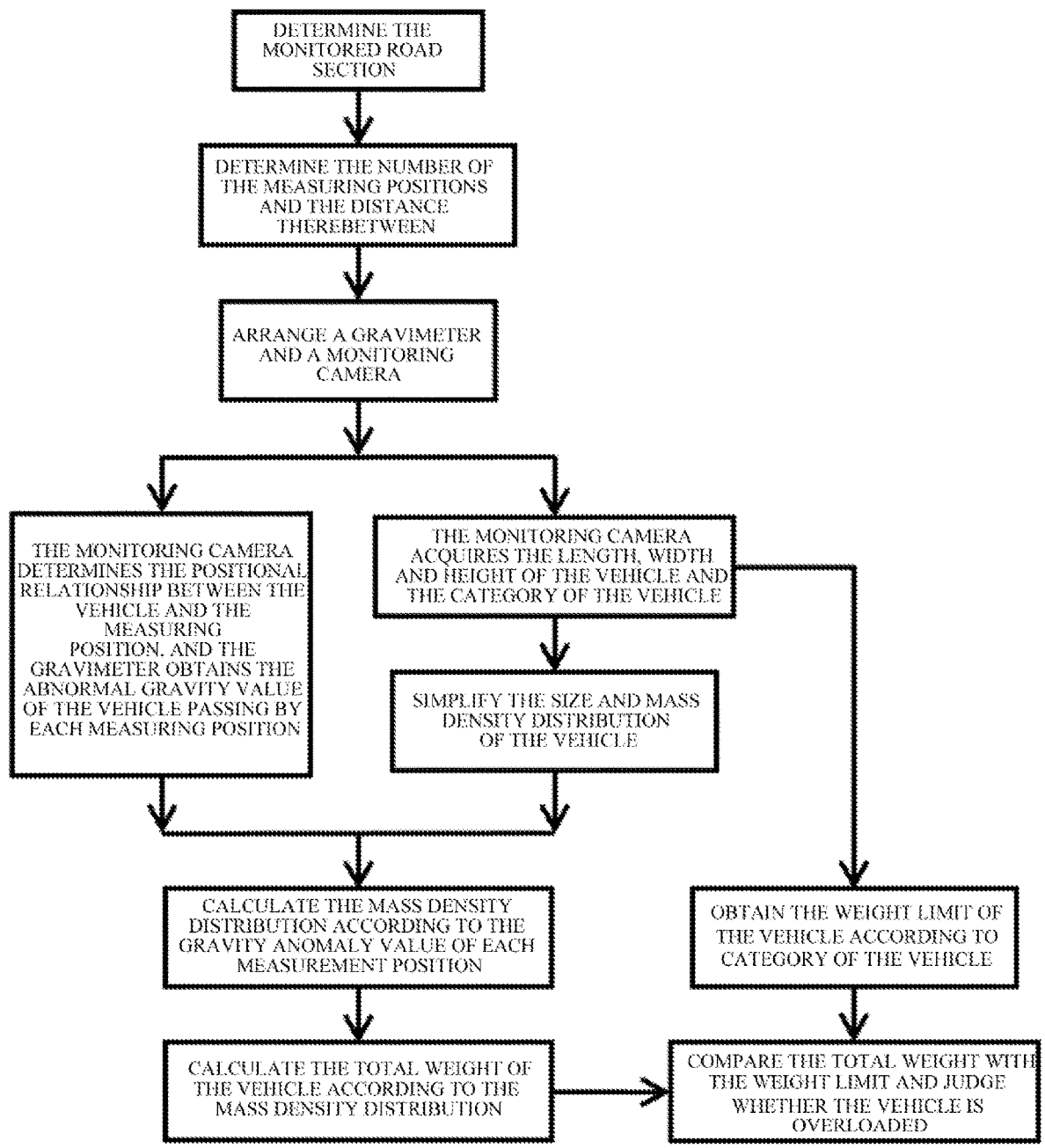
FIG. 1 is a schematic flow chart of the implementation of the present disclosure.

As shown in FIG. 1, a method for monitoring vehicle overload based on gravity anomaly of the present disclosure specifically includes the following steps:

Setting several measuring positions on a single lane. Then using a monitoring camera 5 to determine the position of the vehicle 6, obtain the three geometric dimensions of length, width and height of the vehicle 6, and determine the weight limit of the vehicle 6 by judging the category of the vehicle 6. Obtaining the gravity anomaly value caused by the vehicle 6 when the middle position in the length direction of the vehicle 6 reaching each measuring position by using a gravimeter 4. Simplifying the vehicle 6 into a cuboid 7, and simplifying the mass density distribution into a piecewise constant function along the length direction of the vehicle 6; calculating the values of the piecewise constant function according to the gravity anomaly value caused by the vehicle 6 at each measuring position. Determining the total weight of the vehicle 6 according to the mass density distribution, and judging whether it is overloaded by comparing the total weight of the vehicle 6 with a weight limit of the vehicle 6.

Figure 2:
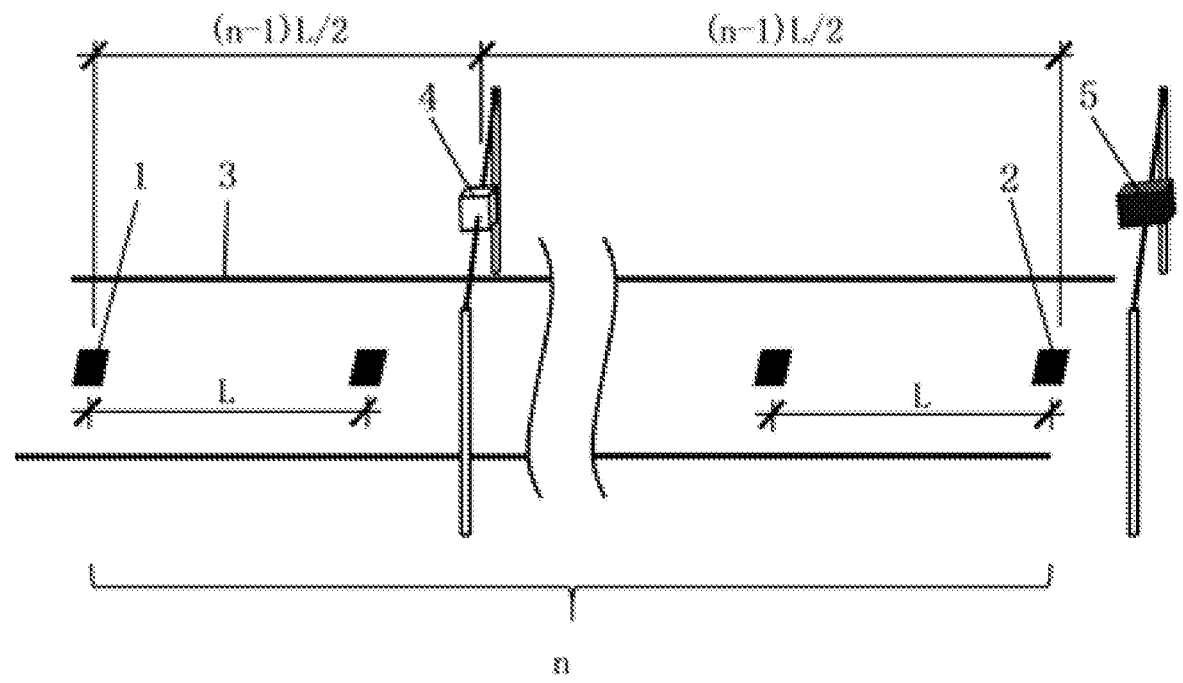
FIG. 2 is a schematic diagram of the layout of the measuring position and monitoring equipment.

As shown in FIG. 2, in the monitored road section, n measuring positions are set on a single lane, where the first measuring position is 1 and the last measuring position is 2. The number of the measuring positions and the distance between the measuring positions can be determined according to the requirements of the road section speed limit and measuring accuracy, but the number of the measuring positions should not be less than 1, and the distance between two measuring positions can be the same or different. In this embodiment, the method will be explained with an equal interval of L.

As shown in FIG. 2, a gravimeter 4 is arranged directly above the intersection point of the center line of a single lane and the equidistance line of the first measuring position 1 and the last measuring position 2; when there is only one measuring position, the gravimeter 4 should be arranged directly above the intersection point of the center line of the single lane and the measuring position. The height of the gravimeter 4 should be higher than the road limit height, and the gravity anomaly value $\Delta g_i (i=1, 2, \ldots, n)$ caused by the vehicle 6 when the middle position in the length direction of the vehicle 6 reaching each measuring position is obtained by the gravimeter 4. In this embodiment, an orthogonal coordinate system is established by taking the intersection point of the center line of the single lane and the equidistance line of the first measuring position 1 and last measuring position 2 as the original point. At this time, the spatial position of the gravimeter 4 is recorded as (O,O,H), where H is the vertical height of the gravimeter 4 away from the road surface.

As shown in FIG. 2, a monitoring camera 5 is arranged above the last measuring position 2 in the driving direction of the vehicle 6, and the position and angle of the monitoring camera 5 should be such that it can accurately capture each measuring position. By using the monitoring camera 5, the three geometric dimensions of the vehicle 6 passing by, i.e., length (a), width (b) and height (c), are obtained, the three geometric dimensions of length, width and height of the vehicle 6 are the maximum values of the vehicle 6 in the directions of length, width and height, respectively. By using the monitoring camera 5, the category of vehicle 6 is judged according to its size, and whether the middle position of the vehicle 6 along the length direction has reached the measuring position is judged.

Figure 3:
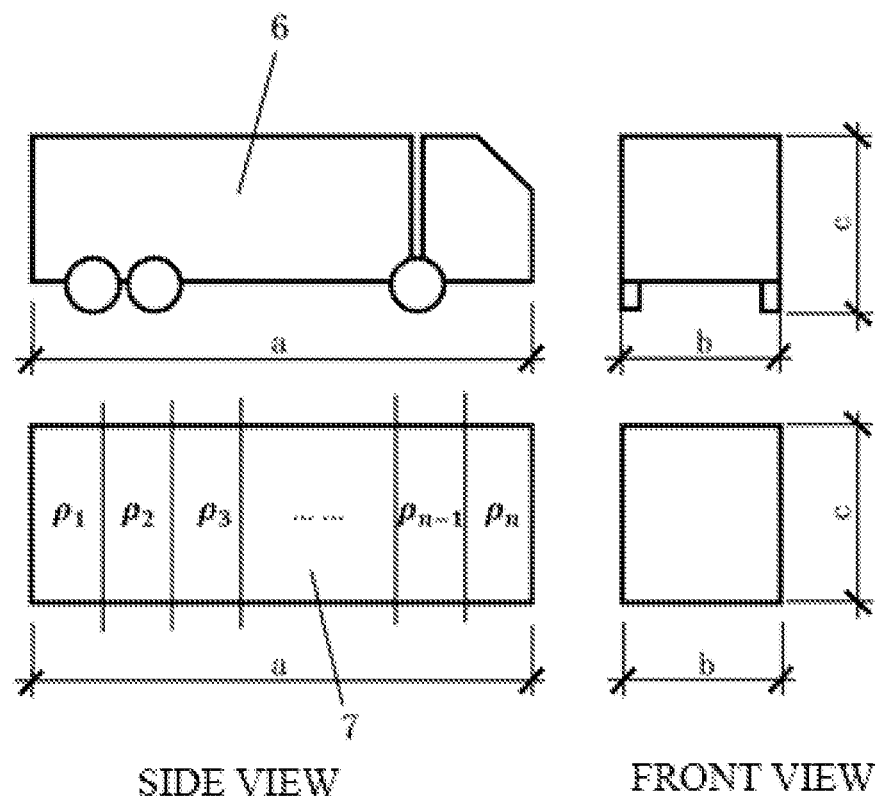
FIG. 3 is a schematic diagram of simplified size and mass density distribution of a vehicle.

As shown in FIG. 3, the vehicle 6 is simplified into a cuboid 7. The length, width, and height of the cuboid 7 correspond to the three geometric dimensions of length, width, and height of the vehicle 6 respectively. The mass density distribution of the vehicle 6 is simplified into a piecewise constant function along the length direction of the vehicle 6. The number m of the values of the piecewise constant function is the same as or less than the number of the measuring positions n, and the values of the piecewise constant function are calculated according to the gravity anomaly value caused by the vehicle 6 at each measuring position. The calculation method is as follows:

The spatial location of one point inside the vehicle 6 is expressed as (x, y, z).

The mass density piecewise constant function p of the vehicle 6 is expressed as follows:

$$\rho = \rho_j, x \in \left[\left|i - \frac{(n+1)}{2}\right|L - \frac{a}{2} + \frac{j-1}{m}a, \left|i - \frac{(n+1)}{2}\right|L - \frac{a}{2} + \frac{j}{m}a\right),$$

$$j = 1, 2, 3, \ldots, m, i = 1, 2, 3, \ldots, n, m \le n,$$

the gravity anomaly value measured at the $i^{th}$ measuring position is expressed as:

$$\Delta g_i = G \int_{|i-(n+1)/2|L-a/2}^{|i-(n+1)/2|L+a/2} \int_{-b/2}^{b/2} \int_0^c \rho \frac{z-H}{R^3} dzdydx$$

where $$R = \left[x^2 + y^2 + (z-H)^2\right]^{0.5}$$

G is a gravitation constant.

n gravity anomaly values are obtained from n measuring positions, and n linear equations which $p_j$ satisfy are formed:

$$\Delta g_i =$$

$$-G \sum_{j=1}^{m} \rho_j \left\{ x \ln(y+R) + y \ln(x+R) - (z-H)\arctan\frac{xy}{(z-H)R} \right\} \Big|_{x_1}^{x_2} \Big|_{y_1}^{y_2} \Big|_{z_1}^{z_2}$$

where $$x_1 = \left|i - \frac{(n+1)}{2}\right|L - \frac{a}{2} + \frac{j-1}{m}a, x_2 = \left|i - \frac{(n+1)}{2}\right|L - \frac{a}{2} + \frac{j}{m}a,$$

$$y_1 = -b/2, y_2 = b/2, z_1 = 0, z_2 = c$$

where the values of $p_j$ are solved according to the above n linear equations, then the mass density piecewise constant function p is determined according to $p_j$.

According to the determined mass density piecewise constant function ρ, the total weight of the vehicle 6 is calculated in real-time as follows:

$$m_{total\ weight} = \sum_{i=1}^{m} \rho_i \frac{a}{m} bc$$

where $m_{total\ weight}$ is the total weight of the vehicle 6.

The weight limit $m_{weight\ limit}$ corresponding to the category of the vehicle 6 is determined.

According to the total weight and weight limit of the vehicle 6, if the total weight exceeds the weight limit, that is, $m_{total\ weight} > m_{weight\ limit}$, it is judged that the vehicle 6 is overloaded. The overloaded vehicle information is sent to a traffic management law enforcement department located downstream of the monitoring device to intercept the relevant vehicles.

[Example 2]

The distance between two measuring positions can be set to different values according to the actual road conditions. When different interval distances are adopted, $$\left|i - \frac{(n+1)}{2}\right|L$$

in the above calculation formulas is replaced by $$\left|\sum_{k=1}^{i-1} L_k - \frac{1}{2} L_{total\ length}\right|,$$

where $$L_{total\ length} = \sum_{k=1}^{n-1} L_k,$$

$L_k$, k=1, 2, ... n−1, is the distance between the $k^{th}$ measuring position and the $(k+1)^{th}$ measuring position.

Those skilled in the art can understand that the above is only a preferred example of the present disclosure, and is not used to limit the present disclosure. Although the present disclosure has been described in detail with reference to the aforementioned examples, for those skilled in the art, they can still modify the technical solutions described in the aforementioned examples, or replace some of the technical features equally. All modifications and equivalent substitutions within the spirit and principles of the present disclosure shall be included in the scope of protection of the present disclosure.

What is claimed is:

1. A method for monitoring vehicle overload based on gravity anomaly, comprising the following steps:

S1, setting a plurality of measuring positions on a single lane, and providing a monitoring device on an upper part of the single lane, wherein the monitoring device has a data acquisition device, a monitoring camera and a gravimeter;

S2, determining, by the monitoring camera, a vehicle position, obtaining, by the monitoring camera, three geometric dimensions of length, width and height of a vehicle when the vehicle position reaching the measuring positions, comparing, by the data acquisition device, the vehicle with vehicle types stored in a database according the obtained three geometric dimensions of length, width and height to identify the category of the vehicle, and determining a weight limit of the vehicle based on the category of the vehicle, wherein the three geometric dimensions of length, width and height are maximum values of the vehicle in length, width and height directions, respectively, and the monitoring camera is arranged above the last measuring position in a driving direction;

S3, using a gravimeter to obtain a gravity anomaly value $\Delta g_i$ (i=1,2, ..., n) caused by the vehicle when a middle position in a length direction of the vehicle reaching each measuring position, wherein the gravimeter is arranged right above the intersection of the center line of the single lane and the measuring position, an orthogonal coordinate system is established by taking an intersection point of a center line of the single lane and an equidistance line of first and last measuring positions as an original point, and a spatial position of the gravimeter is recorded as (0, 0, H), where H represents a vertical height of the gravimeter from a ground;

S4, simplifying the vehicle into a cuboid, wherein the length, width and height of the cuboid correspond to the three geometric dimensions of the vehicle, respectively;

simplifying a mass density distribution into a piecewise constant function along the length direction of the vehicle, and calculating, by the monitoring device, values of the piecewise constant function according to the gravity anomaly value caused by the vehicle at each measuring position, which is specifically as below:

(1) when interval distances between the measuring positions are identical, a mass density piecewise constant function p of the vehicle is expressed as follows:

$$\rho = \rho_j, x \in \left[\left|i - \frac{(n+1)}{2}\right|L - \frac{a}{2} + \frac{j-1}{m}a, \left|i - \frac{(n+1)}{2}\right|L - \frac{a}{2} + \frac{j}{m}a\right)$$

$$j = 1, 2, 3, \ldots, m, i = 1, 2, 3, \ldots, n, m \le n,$$

where x is a horizontal coordinate of a certain point inside the vehicle, n is a number of the measuring positions, m is a number of values of the mass density piecewise constant function, L is the distance between the measuring positions and a is the length of the vehicle;

the gravity anomaly value measured at the $i^{th}$ measuring position is expressed as:

$$\Delta g_i = G \int_{|i-(n+1)/2|L-a/2}^{|i-(n+1)/2|L+a/2} \int_{-b/2}^{b/2} \int_0^c \rho \frac{z-H}{R^3} dz dy dx,$$

wherein $$R = [x^2 + y^2 + (z-H)^2]^{0.5},$$

where G is the gravitation constant, b is the width of the vehicle, c is the height of the vehicle, y is a transverse coordinate of the point inside the vehicle, and z is a vertical coordinate of the point inside the vehicle;

n gravity anomaly values are obtained from n measuring positions, and n linear equations which $\rho_j$ satisfy are formed:

$$\Delta g_i =$$
$$-G\sum_{j=1}^{m}\rho_j\left\{x\ \ln(y+R) + y\ \ln(x+R) - (z-H)\arctan\frac{xy}{(z-H)R}\right\}\Big|_{x_1}^{x_2}\Big|_{y_1}^{y_2}\Big|_{z_1}^{z_2},$$

wherein $$x_1 = \left|i - \frac{(n+1)}{2}\right|L - \frac{a}{2} + \frac{j-1}{m}a, x_2 = \left|i - \frac{(n+1)}{2}\right|L - \frac{a}{2} + \frac{j}{m}a,$$

$$y_1 = -b/2, y_2 = b/2, z_1 = 0, z_2 = c,$$

the values of $\rho_j$ are solved according to the above n linear equations, then the mass density piecewise constant function ρ is determined according to $\rho_j$;

(2) when the interval distances between the measuring positions are different, the calculation process of the mass density piecewise constant function ρ of the vehicle is similar to that when the interval distances between the measuring positions are identical, except that $$\left|i - \frac{(n+1)}{2}\right|L$$

in the above calculation formulas is replaced by $$\left|\sum_{k=1}^{i-1}L_k - \frac{1}{2}L_{total\ length}\right|,$$

wherein $$L_{total\ length} = \sum_{k=1}^{n-1} L_k,$$

$L_k$, k=1,2, ... n−1, is the distance between a $k^{th}$ measuring position and a $(k+1)^{th}$ measuring position; and S5, calculating an actual total weight of the vehicle according to the mass density distribution, the actual total weight of the vehicle $m_{total\ weight}$ is expressed as:

$$m_{total\ weight} = \sum_{i=1}^{m} \rho_i \frac{a}{m} bc,$$

determining the weight limit corresponding to the category of the vehicle, comparing the actual total weight with the weight limit, and when the actual total weight exceeding the weight limit, determining, by the monitoring device, that the vehicle is overloaded, and not preventing the vehicle from continuing to run, so as to perform non-contact real-time measurement of the vehicle load without affecting the normal operation of road traffic.

2. The method for monitoring vehicle overload based on gravity anomaly according to claim 1, wherein the number of the measuring positions and the distances between the measuring positions can be determined according to requirements of road section speed limit and measuring accuracy, but the number of the measuring positions should not be less than one.

3. The method for monitoring vehicle overload based on gravity anomaly according to claim 1, wherein the gravimeter is arranged right above the intersection of the center line of the single lane and the equidistance line of the first measuring position and the last measuring position, and when there is only one measuring position, the gravimeter is arranged right above the intersection of the center line of the single lane and the measuring position, and the arrangement height should be greater than the road height limit.

4. The method for monitoring vehicle overload based on gravity anomaly according to claim 1, wherein the number of values of the mass density piecewise constant function is the same as or less than the number of the measuring positions.

\* \* \* \* \*